Aug. 28, 1928.

C. E. SMITH

PIPE COUPLING

Filed March 25, 1927

1,682,635

Charles E. Smith
INVENTOR

BY Victor J. Evans
ATTORNEY

WITNESS:

Patented Aug. 28, 1928.

1,682,635

UNITED STATES PATENT OFFICE.

CHARLES E. SMITH, OF THREE RIVERS, TEXAS.

PIPE COUPLING.

Application filed March 25, 1927. Serial No. 178,385. REISSUED

The object of this invention is the provision of a coupler for metal pipes, of a construction and arrangement whereby the pipes, screwed in the couplers will have their inner ends flared outwardly or expanded to insure a fluid and air tight joint between the coupler and the pipes.

A further object is the provision of a coupler for pipes that has its bore threaded at the ends thereof, the said threads merging into an annular depression or pocket, the inner wall of which is contacted by a hollow frusto conical member whose outer or reduced end projects into the threaded portion of the bore for engagement with the bore of a pipe which is threaded in the coupler, and whereby to expand or flare the end of the pipe to force the same into the pocket and thereby establish both a fluid and air tight joint between the coupler.

A further object is the provision of a coupler of this type in which pipe members screwed in the coupler have their ends expanded and in such action contact with and compress a filler member between the coupler and the pipe members to positively insure a tight joint between said coupler and between said pipe members.

To the attainment of the above broadly stated objects and others which will present themselves as the nature of the invention is better understood, the improvement further resides in certain other novel features of construction, combination and operative association of parts, a satisfactory embodiment of which is disclosed by the accompanying drawing.

Figure 1:
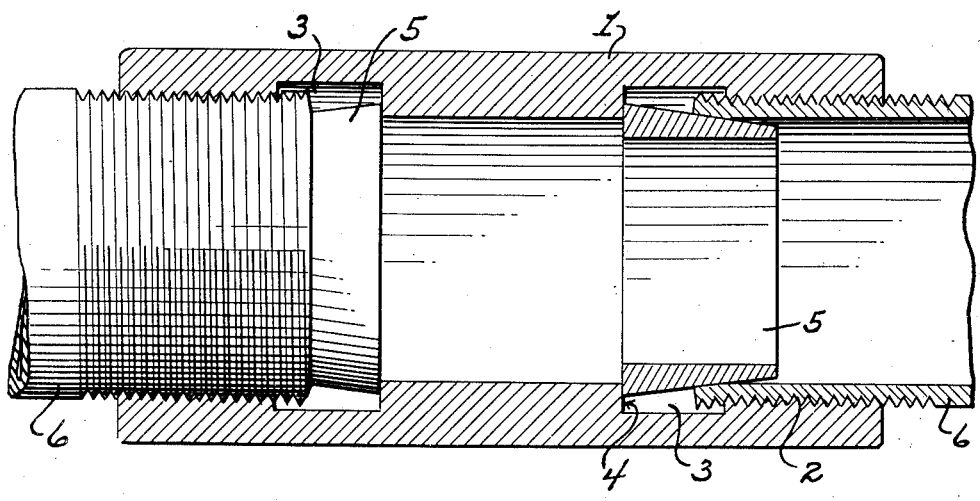
Figure 1 is a central longitudinal sectional view through the improvement.
Figure 2:
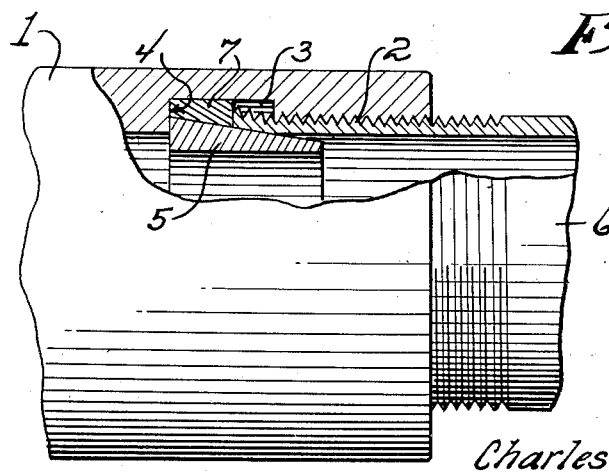
Figure 2 is a detail sectional view to illustrate a further embodiment of the improvement.

While in the drawings I have illustrated a coupler in the nature of a straight tubular member, it is to be understood that the same may be of any of the various shapes of couplings employed for connecting the ends of pipes.

Referring now to the drawings in detail, the numeral 1 designates the coupler. The coupler has its bore at its ends threaded, as at 2, the threaded portion merging into annular pockets 3, and for distinction the inner walls of these pockets are indicated by the numerals 4. Arranged in the coupler and designed to contact with the walls 4 of the pockets there are metal expanders.

The expanders may be in the nature of castings, each having a straight bore but having its outer face flared from one to its opposite end. Thus each of the members 5 is of frusto conical formation and the thickened end of the said member rests directly on the walls or shoulders 4, the reduced ends being extended into the threaded portion 2 of the bore of the coupling. Pipe members 6 are threaded in the ends of the coupler. The expanders 5 have their reduced ends received in the bore of the pipe 6, and as the coupler is screwed home on the pipes the inner ends of the said pipes riding over the flared or conical outer face of the expander members 5 will be expanded or flared outwardly into the pockets 3.

I arrange on the ends of the pipe members 6 a compressible ring or gasket 7. The gasket 7 is designed to be compressed between the inner walls or shoulders 4 of the pockets and the inner and expanded ends of the pipe members 6. The said compressible ring or gasket is caused to ride over the outer conical face of the hardened expander 5 so that the same will be compressed in and fill the pocket 3 to more effectively insure a fluid tight joint between the coupler and the pipe.

By this simple construction and arrangement of parts it will be seen that the coupler establishes both a fluid and air tight joint between the same and the pipes connected therewith. The simplicity of the construction and the advantages thereof will, it is thought, be perfectly apparent to those skilled in the art to which such invention relates so that further detailed description will not be required.

Having described the invention, I claim:—

1. A pipe coupler having its bore threaded from the ends thereof and having annular pockets at the terminals of the threads, and hollow frusto conical expanders formed independent of the coupling and designed to be arranged therein and have their widened ends contact with the inner walls of the pockets and to project into the threaded portion of the bore of the coupler and engage with pipes which are screwed in the coupler.

2. A coupler for the threaded ends of metal pipes, comprising a member having its bore threaded at the ends thereof, and having annular pockets at the terminals of the threads which provide inner straight shoulders, a removable pipe expander contacting the shoulder of each pocket, each of said expanders being of hollow frusto conical formation, the reduced ends of which being extended into the threaded portions of the bore of the coupler, and whereby a pipe screwed in the coupler will have the walls of its bore contacted by the said expanders to flare or expand the pipe ends and project the same into the pockets.

3. A pipe coupler having its bore threaded from the ends thereof and having annular pockets at the terminals of said threads and hollow frusto conical expanders each contacting with the inner walls of one pocket and projecting into the threaded portion of the bore of the coupler, said threaded bore designed to have screwed therein pipe members whose bores are contacted by the frusto conical expanders, and compressible rings on the expanders contacted by the pipe members designed to be forced thereby against the inner walls of the pockets and to be compressed into said pockets.

In testimony whereof I affix my signature.

CHARLES E. SMITH.